(12) United States Patent
Chang et al.

(10) Patent No.: US 12,118,927 B2
(45) Date of Patent: *Oct. 15, 2024

(54) ELECTRONIC APPARATUS

(71) Applicant: InnoLux Corporation, Miao-Li County (TW)

(72) Inventors: Chi-Liang Chang, Miao-Li County (TW); Yi-Hua Hsu, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/359,115

(22) Filed: Jul. 26, 2023

(65) Prior Publication Data

US 2023/0386399 A1 Nov. 30, 2023

Related U.S. Application Data

(63) Continuation of application No. 17/487,098, filed on Sep. 28, 2021, now Pat. No. 11,749,176, which is a
(Continued)

(30) Foreign Application Priority Data

Sep. 26, 2018 (CN) .......................... 201811124400.8

(51) Int. Cl.
*G09G 3/32* (2016.01)
*G09G 3/36* (2006.01)

(52) U.S. Cl.
CPC ................. *G09G 3/32* (2013.01); *G09G 3/36* (2013.01); *G09G 2320/0233* (2013.01); *G09G 2320/0626* (2013.01)

(58) Field of Classification Search
CPC .... G09G 3/32; G09G 3/36; G09G 2320/0233; G09G 2320/0626; G09G 1/167;
(Continued)

(56) References Cited

U.S. PATENT DOCUMENTS

| | | | |
|---|---|---|---|
| 7,864,136 B2 | 1/2011 | Matthies et al. | |
| 11,164,509 B2* | 11/2021 | Chang | G09G 3/36 |
| 11,749,176 B2* | 9/2023 | Chang | G09G 3/32 |
| | | | 345/76 |

FOREIGN PATENT DOCUMENTS

| | | | |
|---|---|---|---|
| KR | 10-20010041001 A | 5/2001 | |
| KR | 10-20080061671 A | 7/2008 | |
| KR | 10-1461995 B | 11/2014 | |

OTHER PUBLICATIONS

Korean language office action dated Sep. 1, 2023, issued in application No. KR 10-2019-0040895.

* cited by examiner

*Primary Examiner* — Vijay Shankar
(74) *Attorney, Agent, or Firm* — McClure, Qualey & Rodack, LLP

(57) ABSTRACT

An electronic apparatus includes a first light emitting array and a second light emitting array. The first light emitting array includes first light-emitting units disposed in a first region and a first sub region. The second light emitting array is disposed adjacent to the first light emitting array. The second light emitting array includes second light-emitting units disposed in a second region and a second sub region. The difference between the average brightness in the first region and the average brightness in the second region is in a range from 0% to 20%, and the difference between the average brightness in the first sub region and the average brightness in the second sub region is less than the difference
(Continued)

between the average brightness in the first region and the average brightness in the second region.

11 Claims, 7 Drawing Sheets

Related U.S. Application Data continuation of application No. 16/360,481, filed on Mar. 21, 2019, now Pat. No. 11,164,509.

(60) Provisional application No. 62/659,787, filed on Apr. 19, 2018.

(58) Field of Classification Search
CPC ...... G09G 3/2096; G09G 5/006; G09G 3/006; G09G 2300/026; G09G 5/12; G09G 3/342; G09G 5/02; G09G 2320/0242; G06F 3/1446; G09F 9/3026; G09F 9/33; G09F 19/22
See application file for complete search history.

ELECTRONIC APPARATUS

CROSS-REFERENCE TO RELATED APPLICATIONS

This application is a Continuation of application Ser. No. 17/487,098, filed Sep. 28, 2021, now U.S. Pat. No. 11,749,176, which is a Continuation of application Ser. No. 16/360,481, filed Mar. 21, 2019, now U.S. Pat. No. 11,164,509, which claims the benefit of U.S. Provisional Application No. 62/659,787, filed on Apr. 19, 2018, and claims priority of China Patent Application No. 2018111244008 filed on Sep. 26, 2018, the entirety of which are incorporated by reference herein.

BACKGROUND

Field of the Disclosure

The present disclosure relates to an electronic apparatus, and in particular to an electronic apparatus having a display panel.

Description of the Related Art

In recent years, display screens have been widely used to dynamically display advertisements. However, due to the size limitations on an operable display screen, it is difficult to display an advertisement on a large area using a single display screen.

In order to solve the above problem, in the prior art, a plurality of display screens are connected into one screen wall to display large-area advertisements. However, each display screen may experience a processing error during production. When the display screens are connected, the images displayed on two adjacent display screens may have differences in brightness or chromaticity, which diminishes the quality of the integrated image.

Accordingly, while existing screen walls have been generally adequate for their intended purposes, they have not been entirely satisfactory in all respects. Consequently, it would be desirable to provide a solution for improving the screen walls.

BRIEF SUMMARY

The electronic apparatus of the present disclosure may improve the quality of the integrated image by connecting display panels with small differences in brightness and chromaticity.

The present disclosure provides an electronic apparatus that includes a first light emitting array and a second light emitting array. The first light emitting array includes a plurality of first light-emitting units disposed in a first region and a first sub region. The first sub region is included in the first region, and an area of the first sub region is less than an area of the first region. The second light emitting array is disposed adjacent to the first light emitting array. The second light emitting array includes a plurality of second light-emitting units disposed in a second region and a second sub region. The first sub region is adjacent to the second sub region, the second sub region is included in the second region, and an area of the second sub region is less than an area of the second region. The difference between an average brightness in the first region and an average brightness in the second region is in a range from 0% to 20%, and a difference between an average brightness in the first sub region and an average brightness in the second sub region is less than the difference between an average brightness in the first region and an average brightness in the second region.

BRIEF DESCRIPTION OF THE DRAWINGS

The disclosure can be more fully understood by reading the subsequent detailed description and examples with references made to the accompanying drawings, wherein.

DETAILED DESCRIPTION

Figure 1:
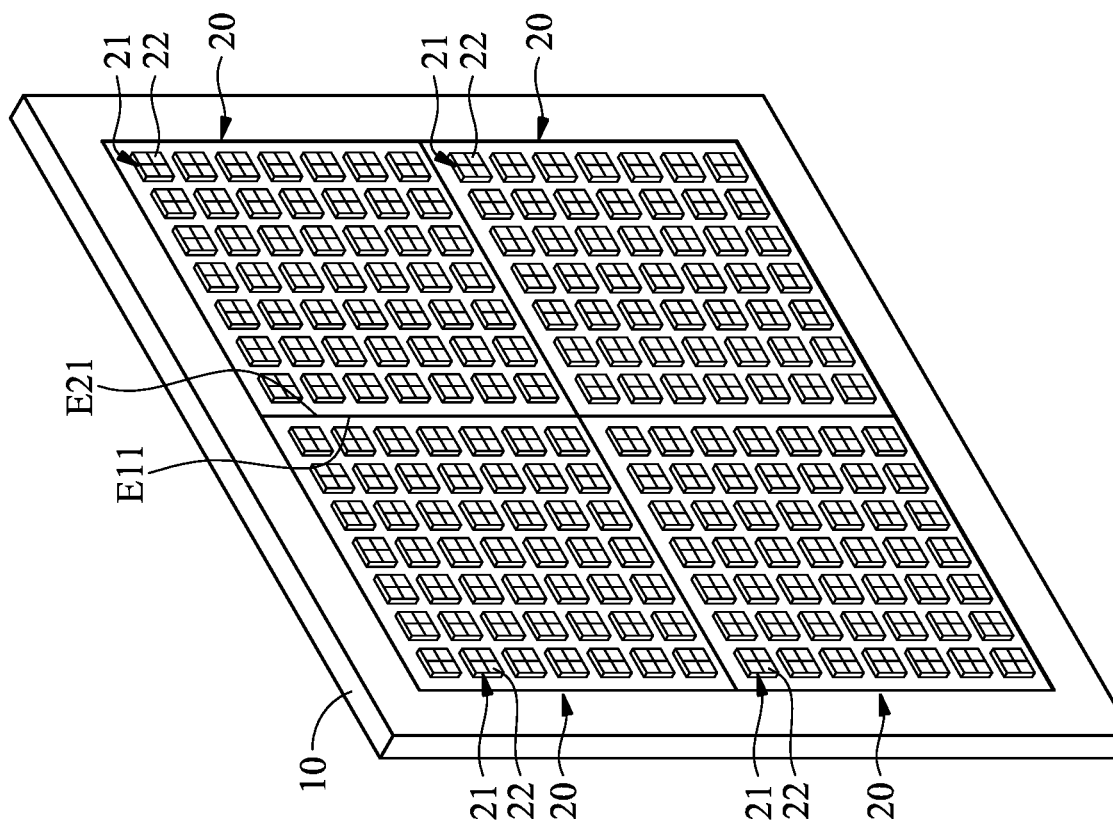
FIG. 1 is a perspective view of the electronic apparatus in accordance with some embodiments of the present disclosure.

The following disclosure provides many different embodiments, or examples, for implementing different features of the present disclosure. Specific examples of components and arrangements are described below to simplify the present disclosure. For example, the formation of a first feature over or on a second feature in the description that follows may include embodiments in which the first and second features are formed in direct contact, and may also include embodiments in which additional features may be formed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed.

The words, such as "first" or "second", in the specification are for the purpose of clarity of description only, and are not relative to the claims or meant to limit the scope of the claims. In addition, terms such as "first feature" and "second feature" do not indicate the same or different features.

Spatially relative terms, such as upper and lower, may be used herein for ease of description to describe one element or feature's relationship to other elements or features as illustrated in the figures. The spatially relative terms are intended to encompass different orientations of the device in use or operation in addition to the orientation depicted in the figures. Moreover, the shape, size, and thickness depicted in the drawings may not be drawn to scale or may be simplified for clarity of discussion; these drawings are merely intended for illustration.

FIG. 1 is a perspective view of the electronic apparatus 1 in accordance with some embodiments of the present disclosure. The electronic apparatus 1 may be a television wall.

The electronic apparatus 1 includes a housing 10 and display panels 20. The display panel 20 may be arranged on the housing 10 in an array.

In the embodiment, the display panels 20 may be arranged on the same plane, and the size of the display panels 20 may be the same. The shape of the display panels 20 may be the same or substantially the same. In the embodiment, the display panels 20 may be rectangular. However, the display panels 20 of the present disclosure are not limited to the same size or shape, as long as the display panels 20 that can be combined and the display signals of the display panels 20 that can be connected to each other. In other words, the size and/or shape of each display panel 20 may vary.

The number of the display panels 20 may be two or more. For example, the number of the display panels 20 may be two, four, six, nine, twelve, or sixteen, but it is not limited thereto. In the embodiment, the number of display panel 20 is 4. Each display panel 20 can be used to display an image. The image displayed by each display panel 20 can be connected to an integrated image.

The display panel 20 may be a light-emitting diode panel, a quantum dot panel or a liquid-crystal panel. The present disclosure does not particularly limit the type of the display panel, as long as the image can be displayed. In the embodiment, the display panel 20 may be a self-illuminating panel, such as a light-emitting diode panel, and a quantum dot panel. The display panel 20 includes light-emitting elements 21. The light-emitting elements 21 may be arranged in an array on the display panel 20, and each light-emitting element 21 may be separated from each other. Moreover, each light-emitting element 21 corresponds to a pixel or a sub-pixel of the integrated image. In another embodiment, the display panel 20 may be liquid-crystal-display (LCD) panel, and the light-emitting elements 21 are the opening regions of the pixels or sub-pixels. The opening regions of the pixels allow the backlight in the display panel 20 to pass through, so as to display the image.

For the purpose of clarity, the size of the light-emitting elements 21 is enlarged in the drawings of the present disclosure and the number of light-emitting elements 21 is reduced. For example, the number of light-emitting elements 21 of each display panel 20 may be in a range from one thousand to thirty million, but it is not limited thereto.

Each light-emitting element 21 includes light-emitting units 22. The light-emitting units 22 may be arranged in an array. In the embodiment, each light-emitting element 21 has four light-emitting units 22, but it is not limited thereto. The distance of two adjacent light-emitting units 22 in one of the light-emitting elements 21 is less than the distance of two light-emitting units 22 respectively in two adjacent light-emitting elements 21. In some embodiments, two adjacent light-emitting units 22 may be connected to each other.

The light-emitting units 22 may be light-emitting diodes. Each light-emitting unit 22 is configured to emit a Light of a specific color. For example, red light-emitting units 22 are configured to emit red light. Green light-emitting units 22 are configured to emit green light. Blue light-emitting units 22 are configured to emit blue light. In the embodiment, each light-emitting element 21 has at least three colors of light-emitting units 22.

Under the condition that the appropriate voltage is supplied to each light-emitting unit 22, the light-emitting units 22 of the same color on each display panel 20 may emit different chromaticity and brightness due to manufacturing errors. When two adjacent display panels 20 display images, there is an error in color and brightness between the two images, which causes the quality of the integrated image to suffer. Therefore, in the embodiment, the difference in color and brightness between two adjacent display panels 20 should be within a predetermined value, which is described in detail below.

Figure 2:
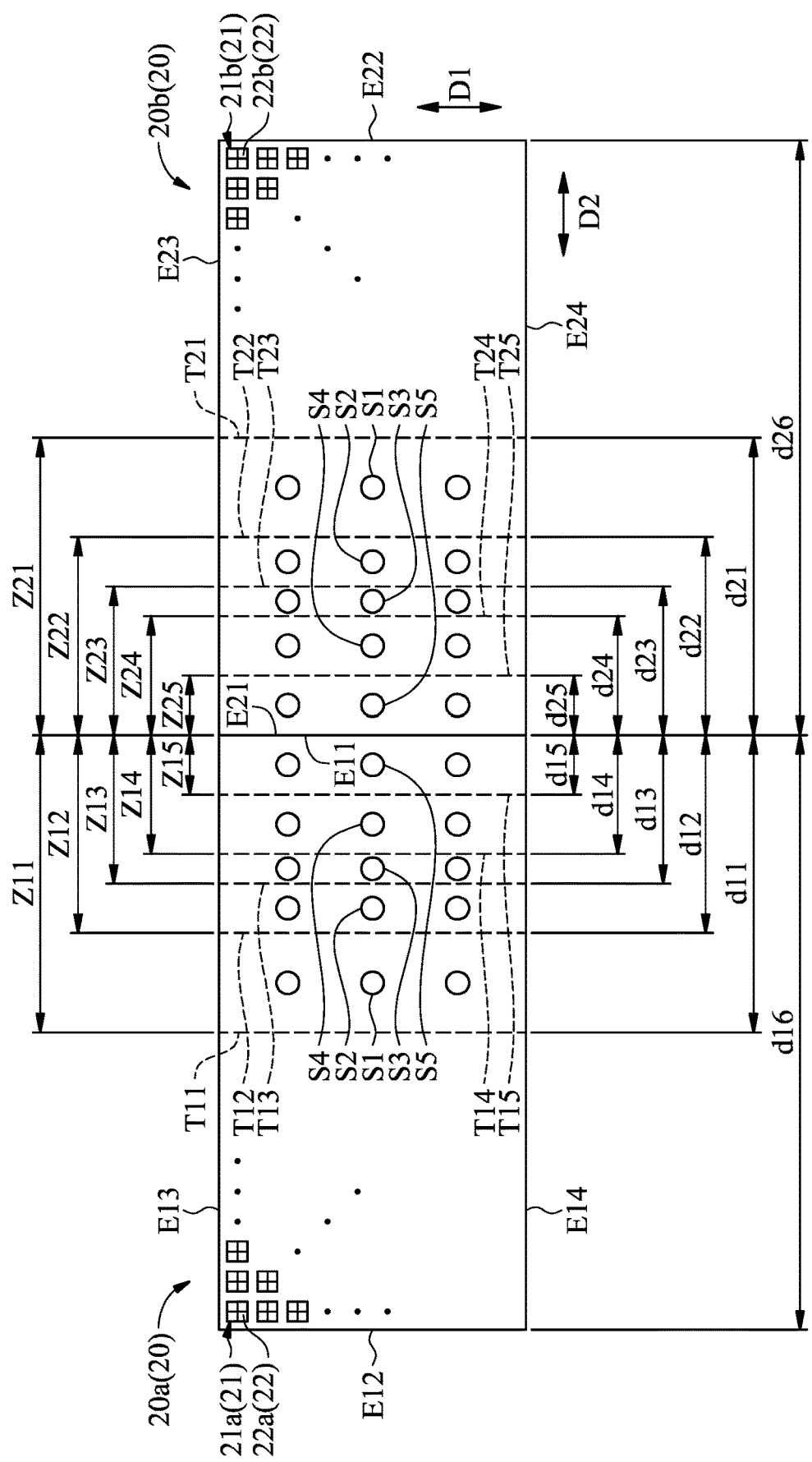
FIG. 2 is a schematic view of the display panel in accordance with some embodiments of the present disclosure.

FIG. 2 is a schematic view of the display panel 20 in accordance with some embodiments of the present disclosure. For the purpose of clarity, two display panels 20 arranged on the same plane are drawn in FIG. 2. Moreover, a few light-emitting elements 21 are drawn in each display panel 20. However, it should be noted that the light-emitting elements 21 should be properly distributed on the display panels 20 as shown in FIG. 1.

In FIG. 2, the display panel (second display panel) 20b are arranged on the right side of the display panel (first display panel) 20a. However, the position of the display panel 20b relative to the display panel 20a in FIG. 2 is only an example, and the position of the display panel 20b relative to the display panel 20a should not be limited to the position in FIG. 2. For example, the display panel 20b can be arranged on the left side, upper side or lower side of the display panel 20a.

In the embodiment, the display panel 20a may be rectangular, but it is not limited thereto. The display panel 20a has an edge (first edge) E11, an edge E12, an edge E13, and an edge E14. Edge E11 is opposite to edge E12. Edge E11 and edge E12 extend in the first direction D1. In other words, edge E11 is parallel to edge E12. The length of edge E11 may be substantially equal to the length of edge E12. However, the present disclosure does not particularly limit whether the edges are parallel or whether the lengths are equal. In an irregular display panel, edge E11 and edge E12 may not be parallel and they may have different lengths.

Edge E11 and edge E12 are connected to edge E13 and edge E14. In some embodiments, edge E11 and edge E12 are perpendicular to edge E13 and edge E14. Edge E13 is opposite to edge E14. Edge E13 and edge E14 extend in the second direction D2. The second direction D2 may be perpendicular to the first direction D1. In other words, edge E13 may be parallel to edge E14. The length of edge E13 may be substantially equal to the length of edge E14. However, the present disclosure does not particularly limit whether the edges are parallel or whether they are the same length. In the irregular display panel, edge E13 may not be parallel to edge E14 and have a different length than edge E14.

The display panel 20b may be rectangular, but it is not limited thereto. The display panel 20b may be polygonal. The display panel 20b has an edge (second edge) E21, an edge E22, an edge E23, and an edge E24. Edge E21 is opposite to edge E22. Edge E21 and edge E22 extend in the first direction D1. In other words, edge E21 may parallel to edge E22. The length of edge E21 may be substantially equal to the length of edge E22.

Edge E21 and edge E22 are connected to edge E23 and edge E24. In some embodiments, edge E21 and edge E22 may be perpendicular to edge E23 and edge E24. Edge E23 is opposite to edge E24. Edge E23 and edge E24 extend in the second direction D2. In other words, edge E23 is parallel to edge E24. The length of edge E23 is substantially equal to the length of edge E24.

As shown in FIG. 2, edge E11 is adjacent to or in contact with edge E21. Edge E11 may be parallel to edge E21. The length of edge E11 may be substantially equal to the length of edge E21. In the embodiment, the lengths of edge E11, edge E12, edge E21 and edge E22 are less than the lengths of edge E13, edge E14, edge E23 and edge E24. In some embodiments, the lengths of edge E11, edge E12, edge E21 and edge E22 are greater than the lengths of edge E13, edge E14, edge E23, and edge E24.

The display panel 20a has a first left region Z11, a second left region Z12, a third left region Z13, a fourth left region Z14, and a fifth left region Z15. The display panel 20a includes light-emitting elements (first light-emitting elements) 21a. The light-emitting elements 21a are suitably distributed in the display panel 20a, and are located in the first left region Z11, the second left region Z12, the third left region Z13, the fourth left region Z14, and the fifth left region Z15.

The first left region Z11 is a region between the edge E11 and a boundary (first boundary) T11 parallel to the edge E11. The distance d11 between the boundary T11 and the edge E11 is about one-half of the width or the length of the display panel 20a. In the present disclosure, the boundary is defined as a line that is parallel to the edges E11 and E21 of two adjacent display panels 20 or a curve with a shape that is substantially the same as the edges E11 and E21 of two adjacent display panels 20. The distance between the boundary and the edge (E11 or E12) is defined as a perpendicular distance between the lines or the maximum distance between two curves.

In the following embodiments, the distance between the boundary T11 and the edge E11 corresponds to the length of the display panel 20.

In the embodiment, the distance d11 between the boundary T11 and the edge E11 may be substantially equal to one-half of the length of display panel 20a. Moreover, the distance d11 between the boundary T11 and edge E11 may be substantially equal to one-half of the distance d16 between edge E11 and edge E12. The width or length of the display panel 20a is measured in a direction that is perpendicular to the edge E11. In the embodiment, distance d16 and distance d11 are measured in substantially the same direction.

The second left region Z12 is a region between the edge E11 and a boundary (second boundary) T12 parallel to the edge E11. The area of the second left region Z12 is less than the area of the first left region Z11. In the embodiment, the area of the second left region Z12 is less than or equal to two-thirds the area of the first left region Z11.

The distance d12 between the boundary T12 and the edge E11 may be substantially equal to one-third the length of the display panel 20a. In the embodiment, the distance d12 between the boundary T12 and the edge E11 may be substantially equal to one-third the length of the display panel 20a. In other words, the distance d12 between the boundary T12 and edge E11 may be substantially equal to one-third the distance d16 between edge E11 and edge E12.

The third left region Z13 is a region between the edge E11 and a boundary (third boundary) T13 parallel to the edge E11. The area of the third left region Z13 is less than the area of the second left region Z12. In the embodiment, the area of the third left region Z13 is less than or equal to three-quarters the area of the second left region Z12.

The distance d13 between the boundary T13 and the edge E11 may be substantially equal to one-quarter the length of the display panel 20a. In the embodiment, the distance d13 between the boundary T13 and the edge E11 may be substantially equal to one-quarter the length of the display panel 20a. In other words, the distance d13 between the boundary T13 and the edge E11 may be substantially equal to one-quarter the distance d16 between the edge E11 and the edge E12.

The fourth left region Z14 is a region between the edge E11 and a boundary T14 parallel to the edge E11. The area of the fourth left region Z14 is less than the area of the third left region Z13. In the embodiment, the area of the fourth left region Z14 is less than or equal to four-fifths the area of the third left region Z13.

The distance d14 between the boundary T14 and the edge E11 may be substantially equal to one-fifth the length of the display panel 20a. In the embodiment, the distance d14 between the boundary T14 and the edge E11 may be substantially equal to one-fifth the length of the display panel 20a. In other words, the distance d14 between the boundary T14 and the edge E11 may be substantially equal to one-fifth the distance d16 of the edge E11 and the edge E12.

The fifth left region Z15 is a region between the edge E11 and a boundary T15 parallel to the edge E11. The area of the fifth left region Z15 is less than the area of the fourth left region Z14. In the embodiment, the area of the fifth left region Z15 is less than or equal to one-half the area of the fourth left region Z14.

The distance d15 between the boundary T15 and the edge E11 may be substantially equal to one-tenth the length of the display panel 20a. In the embodiment, the distance d15 between the boundary T15 and the edge E11 may be substantially equal to one-tenth the length of the display panel 20a. In other words, the distance d15 between the boundary T15 and the edge E11 may be substantially equal to one-tenth the distance d16 between the edge E11 and the edge E12.

The display panel 20b has a first right region Z21, a second right region Z22, a third right region Z23, a fourth right region Z24, and a fifth right region Z25. The display panel 20b includes light-emitting elements (second light-emitting elements) 21b. The light-emitting elements 21b are suitably distributed in the display panel 20b, and are located in the first right region Z21, the second right region Z22, the third right region Z23, the fourth right region Z24, and the fifth right region Z25.

The first right region Z21 is a region between the edge E21 and a boundary (first boundary) T21 parallel to the edge E21. The distance d21 between the boundary T21 and the edge E21 may be equal to one-half of the length of display panel 20b. In the embodiment, the distance d21 between the boundary T21 and the edge E21 may be substantially equal to one-half the distance d26 between the edge E21 and the edge E22. In other words, the distance d21 between the boundary T21 and the edge E21 may be substantially equal to one-half the distance d26 between the edge E21 and the edge E22. The distance d26 may be the length of the display panel 20b. In the embodiment, the distance d26 and the distance d21 are measured in substantially the same direction.

The second right region Z22 is a region between the edge E21 and a boundary T22 parallel to the edge E21. The area of the second right region Z22 is less than the area of the first right region Z21. In the embodiment, the area of the second right region Z22 is less than or equal to two-thirds the area of the first right region Z21.

The distance d22 between the boundary T22 and the edge E21 may be substantially equal to one-third the length of the display panel 20b. In the embodiment, the distance d22 between the boundary T22 and the edge E21 may be substantially equal to one-third the length of the display panel 20b. In other words, the distance d22 between the boundary T22 and the edge E21 may be substantially equal to one-third the distance d26 between edge E21 and edge E22.

The third right region Z23 is a region between the edge E21 and a boundary T23 parallel to the edge E21. The area of the third right region Z23 is less than the area of the second right region Z22. In the embodiment, the area of the third right region Z23 is less than or equal to three-quarters the area of the second right region Z22.

The distance d23 between the boundary T23 and the edge E21 may be substantially equal to one-quarter the length of the display panel 20b. In the embodiment, the distance d23 between the boundary T23 and the edge E21 may be substantially equal to one-quarter the length of the display panel 20b. In other words, the distance d23 between the boundary T23 and the edge E21 may be substantially equal to one-quarter the distance d26 between the edge E21 and the edge E22.

The fourth right region Z24 is a region between the edge E21 and a boundary T24 parallel to the edge E21. The area of the fourth right region Z24 is less than the area of the third right region Z23. In the embodiment, the area of the fourth right region Z24 is less than or equal to four-fifths the area of the third right region Z23.

The distance d24 between the boundary T24 and the edge E21 may be substantially equal to one-fifth the length of the display panel 20b. In the embodiment, the distance d24 between the boundary T24 and the edge E21 may be substantially equal to one-fifth the length of the display panel 20b. In other words, the distance d24 between the boundary T24 and edge E21 may be substantially equal to one-fifth the distance d26 of edge E21 and edge E22.

The fifth right region Z25 is a region between the edge E21 and a boundary T25 parallel to the edge E21. The area of the fifth right region Z25 is less than the area of the fourth right region Z24. In the embodiment, the area of the fifth right region Z25 is less than or equal to one-half the area of the fourth right region Z24.

The distance d25 between the boundary T25 and the edge E21 may be substantially equal to one-tenth the length of the display panel 20b. In the embodiment, the distance d25 between the boundary T25 and the edge E21 may be substantially equal to one-tenth the length of the display panel 20b. In other words, the distance d25 between the boundary T25 and edge E21 may be substantially equal to one-tenth the distance d26 between edge E21 and edge E22.

In the embodiment, the area of the first left region Z11 is substantially equal to the area of the first right region Z21. The area of the second left region Z12 is substantially equal to the area of the second right region Z22. The area of the third left region Z13 is substantially equal to the area of the third right region Z23. The area of the fourth left region Z14 is substantially equal to the area of the fourth right region Z24. The area of the fifth left region Z15 is substantially equal to the area of the fifth right region Z25.

In the embodiment, the difference between the average brightness of the first light-emitting units 22a in the first left region Z11 and the average brightness of the second light-emitting units 22b in the first right region Z21 is in a range from 0% to 20%. The difference between the average brightness of the first light-emitting units 22a located in the second left region Z12 and the average brightness of the second light-emitting units 22b located in the second right region Z22 is in a range from 0% to 14%. In the present disclosure, the measurement of the average brightness may be measured using a CA-210 (Display color analysis), or may be measured using other suitable instruments, but the present disclosure is not particularly limited thereto.

In the embodiment, the difference between the average brightness of the first light-emitting units 22a in the third left region Z13 and the average brightness of the second light-emitting units 22b in the third right region Z23 is in a range from 0% to 10%. The difference between the average brightness of the first light-emitting units 22a in the fourth left region Z14 and the average brightness of the second light-emitting units 22b in the fourth right region Z24 is in a range from 0% to 7%.

In the embodiment, the difference between the average brightness of the first light-emitting units 22a in the fifth region Z15 and the average brightness of the second light-emitting units 22b in the fifth region z25 is in a range from 0% to 5%.

In this embodiment, at least three test regions are selected in each region, and the brightness of light-emitting units 22 in the test regions are detected. The average brightness is obtained by averaging the brightness of the test regions. In some embodiments, during the test, all light-emitting units 22 in the display panel 20 can be activated, and light-emitting units 22 are provided with the appropriate voltage, current or power.

The test regions may be close to edges E13 and E23, close to edges E14 and E24, close to regions between edge E13 and edge E14, and/or regions between edge E23 and edge E24.

For example, the brightness of light-emitting units (first light-emitting units) 22a in at least three first test regions S1 in the first left region Z11 (depending on the size of the test instrument detection heads) is detected and averaged, so as to obtain the average brightness of the light-emitting units 22a located in the first left region Z11. The brightness of light-emitting units (second light-emitting units) 22b in at least three first test regions S1 in the first right region Z21 is detected and averaged, so as to obtain the average brightness of the light-emitting units 22b located in the first right region Z21. The first test region S1 may not be located in the second left region Z12 and the second right region Z22.

For example, the brightness of light-emitting units 22a in at least three second test regions S2 in the second left region Z12 is detected and averaged, so as to obtain the average brightness of the light-emitting units 22a located in the second left region Z12. The brightness of light-emitting units 22b in at least three second test regions S2 in the second right region Z22 is detected and averaged, so as to obtain, and the average brightness of the light-emitting units 22b located in the second right region Z22. The second test region S2 may not be located in the third left region Z13 or the third right region Z23.

For example, the brightness of light-emitting units 22a in at least three third test regions S3 in the third left region Z13 is detected and averaged, so as to obtain the average brightness of the light-emitting units 22a located in the third left region Z13. The brightness of light-emitting units 22b in at least three third test regions S3 in the third right region Z23 is detected and averaged, so as to obtain the average brightness of the light-emitting units 22b located in the third right region Z23. The third right region Z23 may not be located in the fourth left region Z14 or the fourth right region Z24.

For example, the brightness of light-emitting units 22a in at least three fourth test regions S4 in the fourth left region Z14 is detected and averaged, so as to obtain the average brightness of the light-emitting units 22a located in the fourth left region Z14. The brightness of light-emitting units 22b in at least three fourth test regions S4 in the fourth right region Z24 is detected and averaged, so as to obtain the average brightness of the light-emitting units 22b located in the fourth right region Z24. The fourth right region Z24 may not be located in the fifth left region Z15 or the fifth right region Z25.

For example, the brightness of light-emitting units 22a in at least three fifth test regions S5 in the fifth left region Z15 is detected and averaged, so as to obtain the average brightness of the light-emitting units 22a located in the fifth left region Z15. The brightness of light-emitting units 22b in at least three fifth test regions S5 in the fifth left region Z15 is detected and averaged, so as to obtain the average brightness of the light-emitting units 22b located in the fifth right region Z25.

In the embodiment, the absolute value of the difference between the X-axis chromaticity coordinate (or the Y-axis chromaticity coordinate) of the light-emitting units 22a located in the first left region Z11 and the X-axis chromaticity coordinate (or the Y-axis chromaticity coordinate) of the light-emitting units 22b located in the first right region Z21 is in a range from 0 to 0.01. In the present disclosure, the chromaticity coordinate may be a chromaticity coordinate conforming to the CIE1931 standard, but it is not limited thereto.

In the embodiment, the difference between the X-axis chromaticity coordinate (or the Y-axis chromaticity coordinate) of light-emitting units 22a located in the second left region Z12 and the X-axis chromaticity coordinate (or the Y-axis chromaticity coordinate) of light-emitting units 22b located in the second right region Z22 is in a range from 0 to 0.008. The difference between the X-axis chromaticity coordinate (or Y-axis chromaticity coordinate) of the light-emitting units 22a located in the third left region Z13 and the X-axis chromaticity coordinate (or Y-axis of the light-emitting units 22b) located in the third right region Z23 is in a range from 0 to 0.006.

In the embodiment, the difference between the X-axis chromaticity coordinate (or Y-axis chromaticity coordinate) of the light-emitting units 22a located in the fourth left region Z14 and the X-axis chromaticity coordinate (or Y-axis chromaticity coordinate) of the light-emitting units 22b located in the fourth right region Z24 is in a range from 0 to 0.004. The difference between the X-axis chromaticity coordinate (or the Y-axis chromaticity coordinate) of the light-emitting units 22a located in the fifth region Z15 and the X-axis chromaticity coordinate (or Y-axis chromaticity coordinate) of the light-emitting units 22b located in the fifth region z25 is in a range from 0 to 0.003.

The X-axis chromaticity coordinate (or the Y-axis chromaticity coordinate) is an X-axis chromaticity coordinate (or a Y-axis chromaticity coordinate) of the light-emitting units 22 with the same color in at least three test regions of each region. In some embodiments, during the test, the light-emitting units 22 of the same color (such as red light-emitting units 22, green light-emitting units 22, or blue light-emitting units 22) in the display panel 20 can be activated, and the appropriate voltage, current or power of the light-emitting units 22 can be provided.

For example, the X-axis chromaticity coordinates and the Y-axis chromaticity coordinates of the light-emitting units 22a in at least three first test regions S1 in the first left region Z11 are detected and averaged, so as to obtain the X-axis chromaticity coordinate and the Y-axis chromaticity coordinate of the light-emitting units 22a in the first left region Z11. The X-axis chromaticity coordinates and the Y-axis chromaticity coordinates of the light-emitting units 22b in at least three first test regions S1 in the first right region Z21 are detected and averaged, so as to obtain the X-axis chromaticity coordinate and the Y-axis chromaticity coordinate of the light-emitting units 22b in the first right region Z21.

For example, the X-axis chromaticity coordinates and the Y-axis chromaticity coordinates of the light-emitting units 22a in at least three second test regions S2 in the second left region Z12 are detected and averaged, so as to obtain the X-axis chromaticity coordinate and the Y-axis chromaticity coordinate of the light-emitting units 22a in the second left region Z12. The X-axis chromaticity coordinates and the Y-axis chromaticity coordinates of the light-emitting units 22b in at least three second test regions S2 in the second right region Z22 are detected and averaged, so as to obtain the X-axis chromaticity coordinate and the Y-axis chromaticity coordinate of the light-emitting units 22b in the second right region Z22.

For example, the X-axis chromaticity coordinates and the Y-axis chromaticity coordinates of the light-emitting units 22a in at least three third test regions S3 in the third left region Z13 are detected and averaged, so as to obtain the X-axis chromaticity coordinate and the Y-axis chromaticity coordinate of the light-emitting units 22a in the third left region Z13. The X-axis chromaticity coordinates and the Y-axis chromaticity coordinates of the light-emitting units 22b in at least three third test regions S3 in the third right region Z23 are detected and averaged, so as to obtain the X-axis chromaticity coordinate and the Y-axis chromaticity coordinate of the light-emitting units 22b in the third right region Z23.

For example, the X-axis chromaticity coordinates and the Y-axis chromaticity coordinates of the light-emitting units 22a in at least three fourth test regions S4 in the fourth left region Z14 are detected and averaged, so as to obtain the X-axis chromaticity coordinate and the Y-axis chromaticity coordinate of the light-emitting units 22a in the fourth left region Z14. The X-axis chromaticity coordinates and the Y-axis chromaticity coordinates of the light-emitting units 22b in at least three fourth test regions S4 in the fourth right region Z24 are detected and averaged, so as to obtain the X-axis chromaticity coordinate and the Y-axis chromaticity coordinate of the light-emitting units 22b in the fourth right region Z24.

For example, the X-axis chromaticity coordinates and the Y-axis chromaticity coordinates of the light-emitting units 22a in at least three fifth test regions S5 in the fifth left region Z15 are detected and averaged, so as to obtain the X-axis chromaticity coordinate and the Y-axis chromaticity coordinate of the light-emitting units 22a in the fifth left region Z15. The X-axis chromaticity coordinates and the Y-axis chromaticity coordinates of the light-emitting units 22b in at least three fifth test regions S5 in the fifth right region Z25 are detected and averaged, so as to obtain the X-axis chromaticity coordinate and the Y-axis chromaticity coordinate of the light-emitting units 22b in the fifth right region Z25.

When the brightness and the chromaticity coordinate of the light-emitting units 22a and 22b of the display panel 20a and the display panel 20b conform to the above detection formula, the deviation of the color and brightness between the images displayed by the display panel 20a and the display panel 20b are less. Therefore, the connection of the display panel 20a and the display panel 20b is appropriate.

On the other hand, when the brightness and the chromaticity coordinate of the light-emitting units 22a and 22b of the display panel 20a and the display panel 20b do not conform to the above detection formula, it means that the connection of the display panel 20a and the display panel 20b is inappropriate. Accordingly, another display panel 20 may be selected to connect to the display panel 20a. Alternatively, the brightness and chromaticity of the light-emitting units 22a of the display panel 20a may be adjusted to match the detection formula, or the brightness and chromaticity of the light-emitting units 22b of the display panel 20b may be adjusted to match the detection formula in order to maintain the quality of the integrated image.

Figure 3:
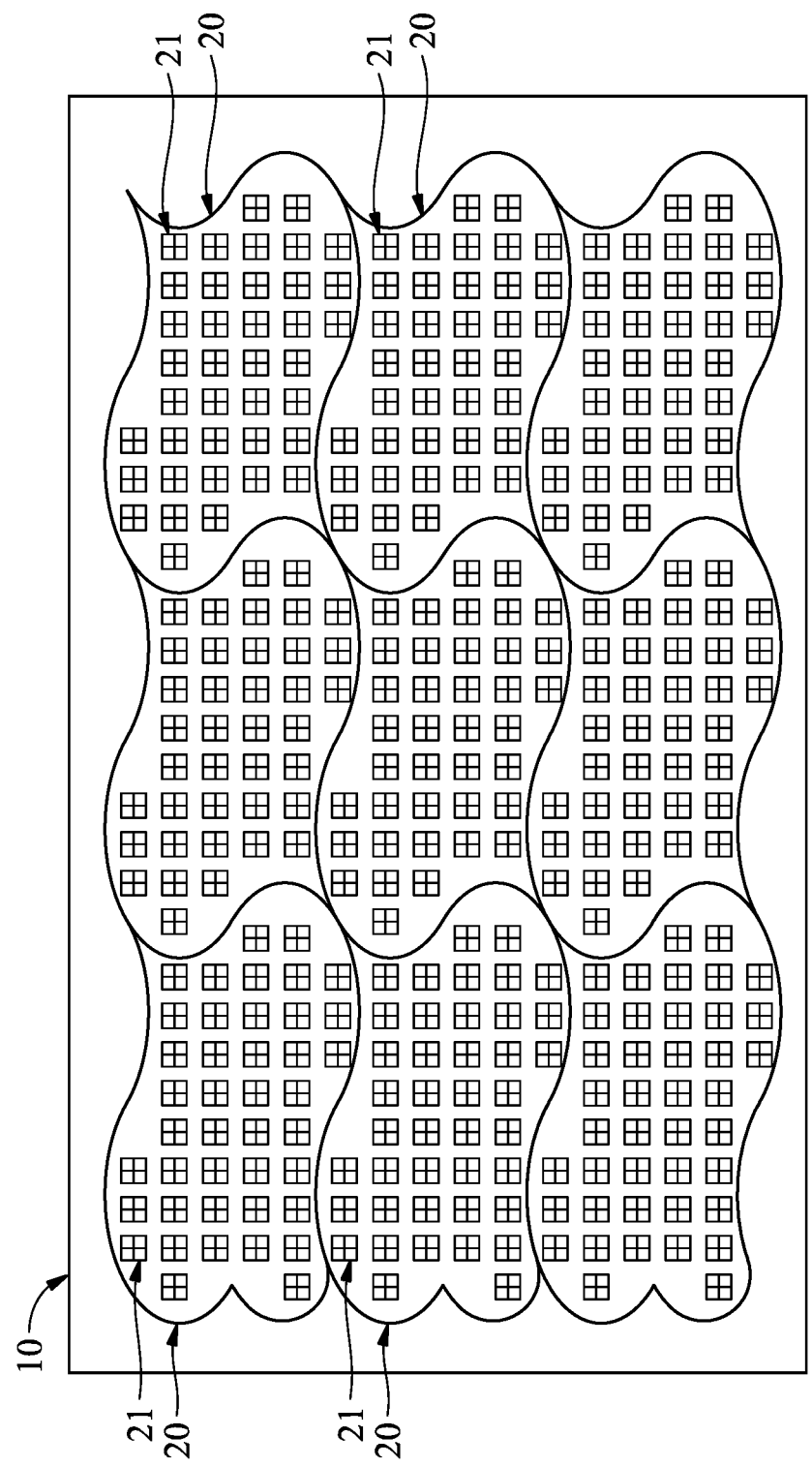
FIG. 3 is a schematic view of the electronic apparatus in accordance with some embodiments of the present disclosure.
Figure 4:
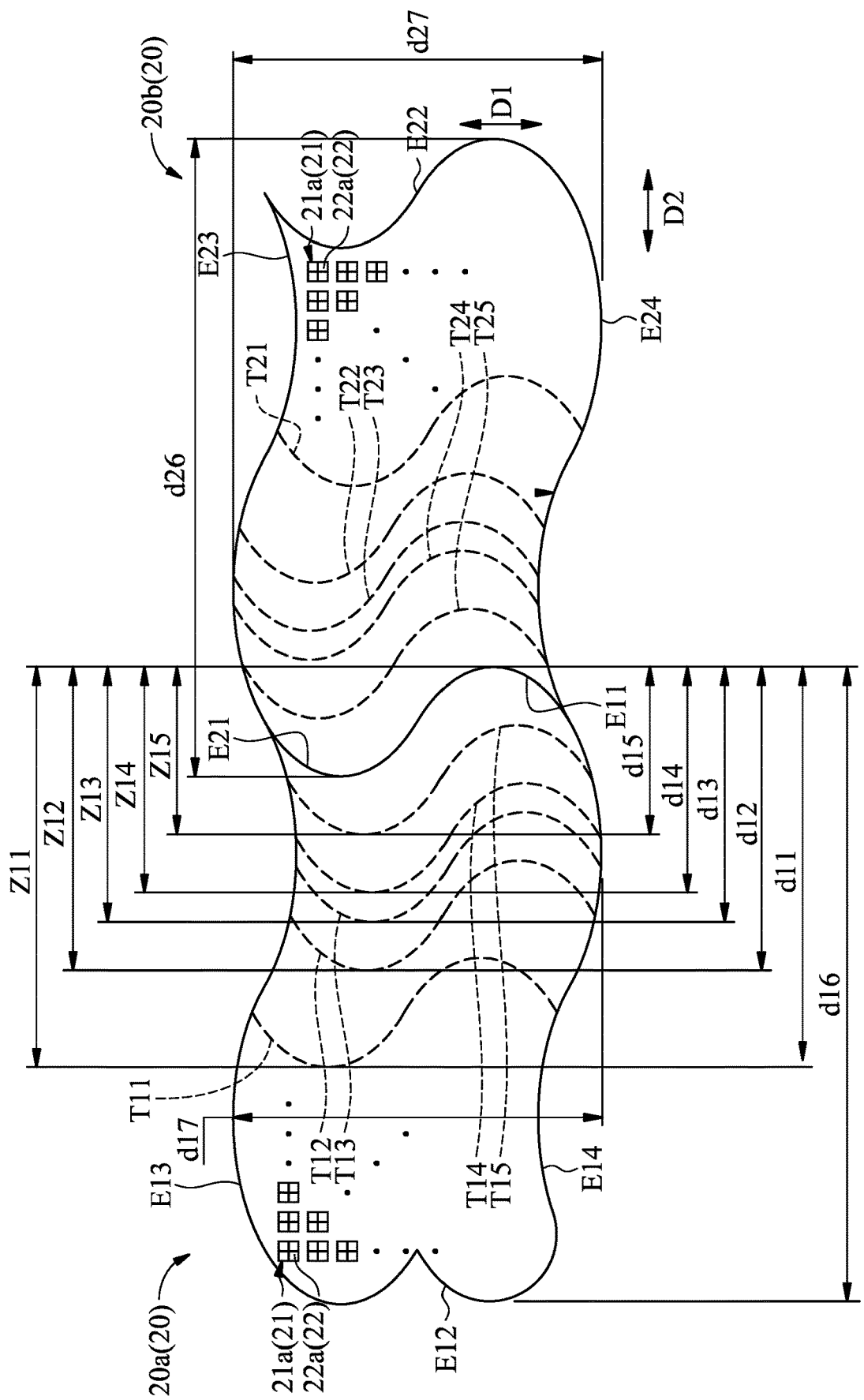
FIG. 4 is a schematic view of the display panel in accordance with some embodiments of the present disclosure.

FIG. 3 is a schematic view of the electronic apparatus 1 in accordance with some embodiments of the present disclosure. FIG. 4 is a schematic view of the display panel 20 in accordance with some embodiments of the present disclosure. In some embodiments, the display panel 20 may be a polygonal or irregular shape. The polygon may be a triangle, a quadrangle, a pentagon, or a hexagon. As shown in FIG. 3, the display panels 20 are irregular shapes and are connected to each other.

In the embodiment of FIG. 3 and FIG. 4, the irregular electronic apparatus 1 may have regions as the embodiment of FIG. 2 (such as the first left region Z11, the second left region Z12, the first right region Z21, and the second right region Z22). However, the difference from FIG. 2 is that the boundaries T11, T12, T13, T14, and T15 in FIG. 4 are curved, and the shape of the curves is approximately similar to edges E11 and E12. The remaining features are the same as those in FIG. 2, and are not described again herein.

In the embodiment, the length of the display panel 20a is the maximum distance d16 from edge E11 to edge E12 in the second direction D2. The width of the display panel 20a is the maximum distance d17 from edge E13 to edge E14 in the first direction D1. As shown in FIG. 4, edge E11 and edge E12 may not be parallel to each other and may have different lengths. The shape of the boundaries T11, T12, T13 and T14 correspond to the shape of the edge E11 in the second direction D2, and the length of the boundaries T11, T12, T13 and T14 may be different from the edge E11.

The length of the display panel 20b is the maximum distance d26 from edge E21 to edge E22 in the second direction D2. The width of the display panel 20a is the maximum distance d27 from edge E13 to edge E14 in the first direction D1. As shown in FIG. 4, edge E21 and edge E22 may not be parallel to each other and may have different lengths. The shape of the boundaries T11, T12, T13 and T14 correspond to the shape of the edge E21 in the second direction D2, and the length of the boundaries T11, T12, T13 and T14 may be different from the edge E21.

It should be understood that the settings of regions, such as the first left region Z11 and the first right region Z21, are for cases where the display panels 20 are connected in the second direction D2. However, in another embodiment, the display panels 20 are connected in the first direction D1 (not shown), and have applicable regions and features, though they are not described herein.

Figure 5:
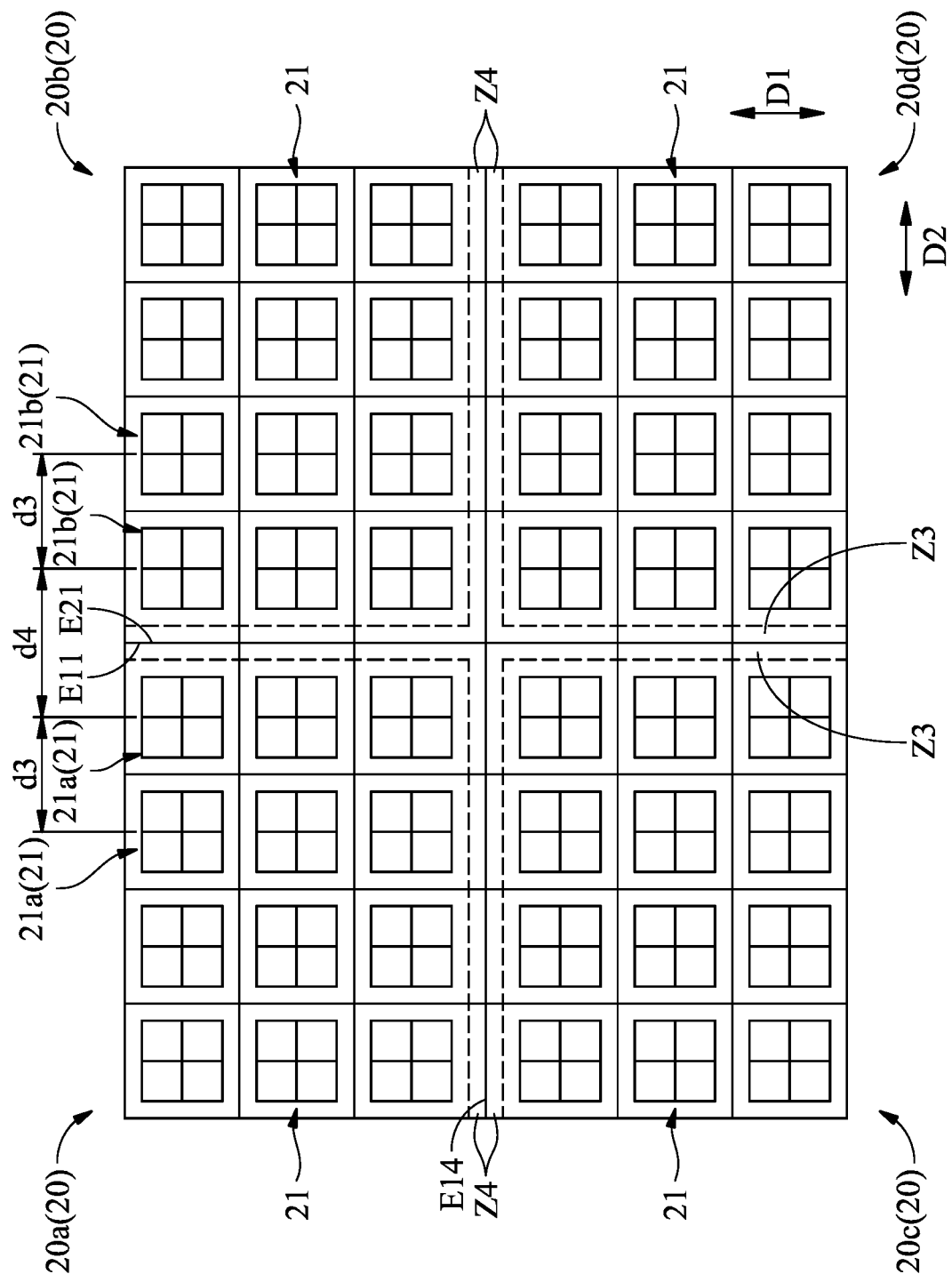
FIG. 5 is a schematic view of the display panels in accordance with some embodiments of the present disclosure.

FIG. 5 is a schematic view of the display panels 20 in accordance with some embodiments of the present disclosure. There are four display panels 20 shown in FIG. 5. In one display panel 20, the pitches d3 (first pitch) of each of the centers of two adjacent light-emitting elements 21 are the same. However, when two display panels are connected, the pitch d4 (second pitch) of the centers of two adjacent light-emitting elements 21 (for example, the adjacent light-emitting elements 21a and 21b) of two adjacent display panels 20 (for example, the display panels 20a and 20b) is different from pitch d3 (first pitch) due to the deviation of the edge of the display panels Therefore, the quality of the integrated image may be decreased.

Therefore, in the embodiment shown in FIG. 5, before the display panels 20 are connected, the cutting regions Z3 and Z4 of the display panels 20 can be cut so that the pitch d3 (first pitch) of each of the centers of the two adjacent light-emitting elements 21 can be equal.

Figure 6:
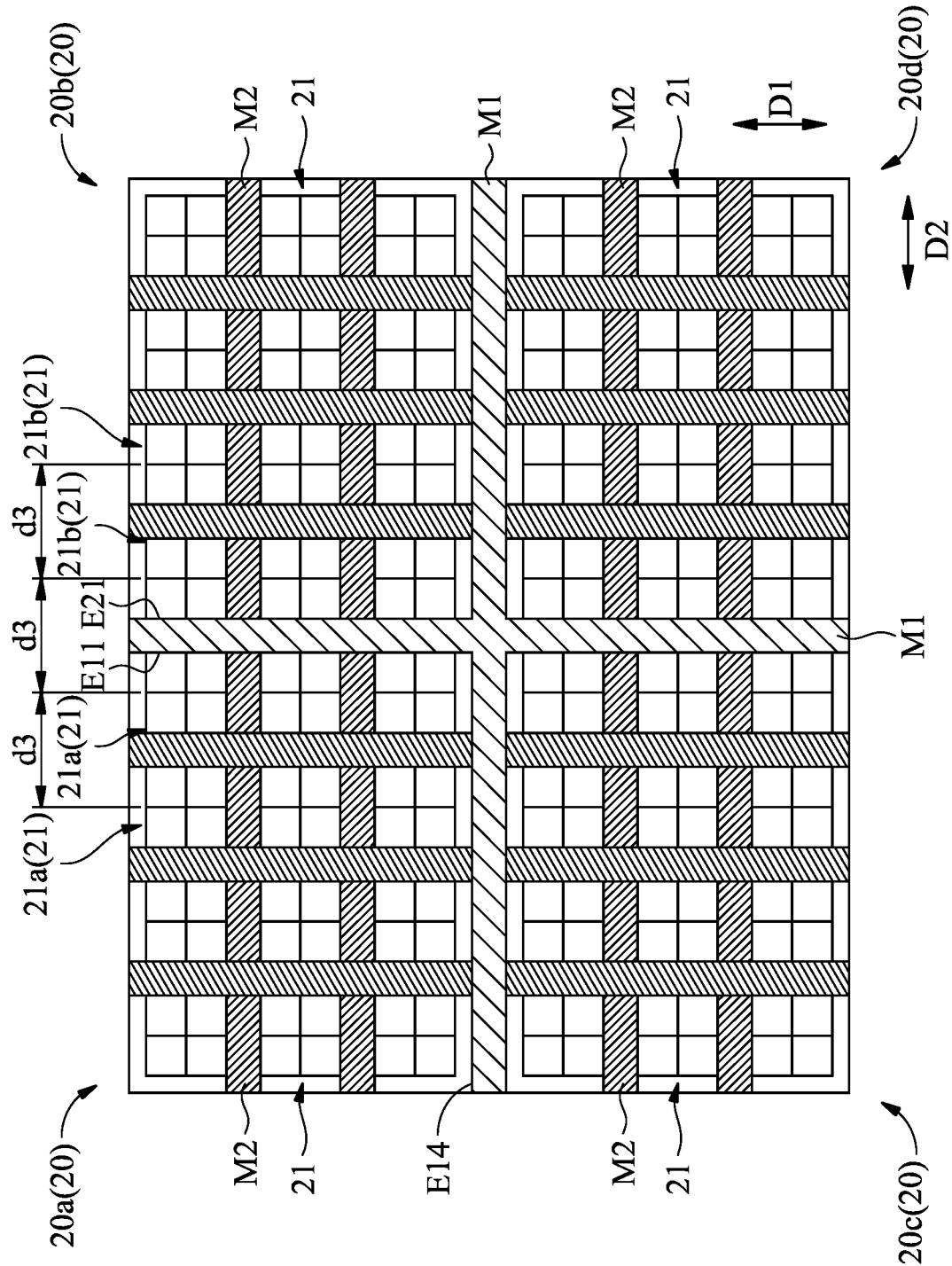
FIG. 6 is a schematic view of the display panel in accordance with some embodiments of the present disclosure.

FIG. 6 is a schematic view of the display panel 20 in accordance with some embodiments of the present disclosure. As shown in FIG. 6, after the cutting regions Z3 and Z4 of each display panel 20 in FIG. 5 are cut, the minimum distance (vertical distance) between the center of the light-emitting elements (first light-emitting elements) 21a of the display panel 20a and the edge E11 in the second direction D2 is shortened. Moreover, the minimum distance (vertical distance) between the center of the light-emitting elements (first light-emitting elements) 21b of the display panel 20b and the edge E21 in the second direction D2 is shortened. The relative positions of the display panel 20a and the display panel 20b can be adjusted. Accordingly, the pitch d3 (first pitch) between the centers of two adjacent light-emitting elements 21a in the second direction may be substantially equal to the pitch d4 (second pitch) between the centers of the light-emitting elements 21a adjacent to the edge E11 and the light-emitting elements 21b adjacent to the edge E21 in the second direction, wherein the pitch d4 (second pitch) may be 70% to 130% the pitch d3 (first pitch). In another embodiment, a ratio of the second pitch to the first pitch is in a range from 0.7 to 1.3. The pitch d3 (first pitch) between the centers of two adjacent light-emitting elements 21b in the second direction may be substantially equal to the pitch d4 (second pitch) between the centers of the light-emitting elements 21a adjacent to the edge E11 and the light-emitting elements 21b adjacent to the edge E21 in the second direction, wherein the pitch d4 (second pitch) may be 70% to 130% the pitch d3 (first pitch). In another embodiment, a ratio of the second pitch to the first pitch is in a range from 0.7 to 1.3. Thus, the quality of the integrated image may be improved. The electronic device of the present disclosure can also have the same features in the first direction D1, and may not be described here.

In the embodiment, a low-reflection material M1 may be disposed between the edge E11 of the display panel 20a and the edge E21 of the display panel 20b. The reflectivity of the low-reflection material M1 may be in a range from 0% to 10%. In some embodiments, the low-reflection material M1 may be black. By the low-reflection material M1, light can be prevented from reflecting through the gap between the edge E11 and the edge E21, which may affect the quality of the integrated image. In some embodiments, the difference of the reflectivity between the surfaces of low-reflection material M1 and the display panels 20 (20a, 20b, 20c and 20d) may be in a range from 0% to 10%. The difference of the reflectivity between the low-reflection material M1 and the display panel 20 may be reduced by the low-reflection material M1, and thus the quality of the integrated image may be improved.

Moreover, the low-reflection material M1 may be disposed between the edge E14 of the display panel 20a and the edge of the display panel (third display panel) 20c. The low-reflection material M1 may be disposed between the edge of the display panel 20b and the edge of the display panel (third display panel) 20d. The low-reflection material M1 may be disposed between the edge of the display panel 20c and the edge of the display panel 20d. The reflection of light between two display panels 20 may be reduced by the low-reflection material M1, and thus the quality of the integrated image may be improved. Moreover, the difference between low-reflection material M1 and display panel 20 for light reflectivity may be reduced by the low-reflection material M1, and thus the quality of the integrated image may be improved.

As shown in FIG. 6, the display panel 20 further includes a shading material M2 disposed between the light-emitting elements 21. In other words, the shading material M2 may around each light-emitting element 21. For example, the shading material (first shading material) M2 may be disposed between the light-emitting elements 21a of the display panel 20a. The shading material (second shading material) M2 may be disposed between the light-emitting elements 21b of the display panel 20b.

In the embodiment, the shading material M2 may include polymerized siloxanes, polycarbonate) or other insulating material or flexible material. The reflectivity of the shading material M2 may be in a range from 0% to 10%. Moreover, in the present disclosure, the reflectivity of the material or display panel can be obtained by measuring the positive viewing angle with a spectrophotometer.

Figure 7:
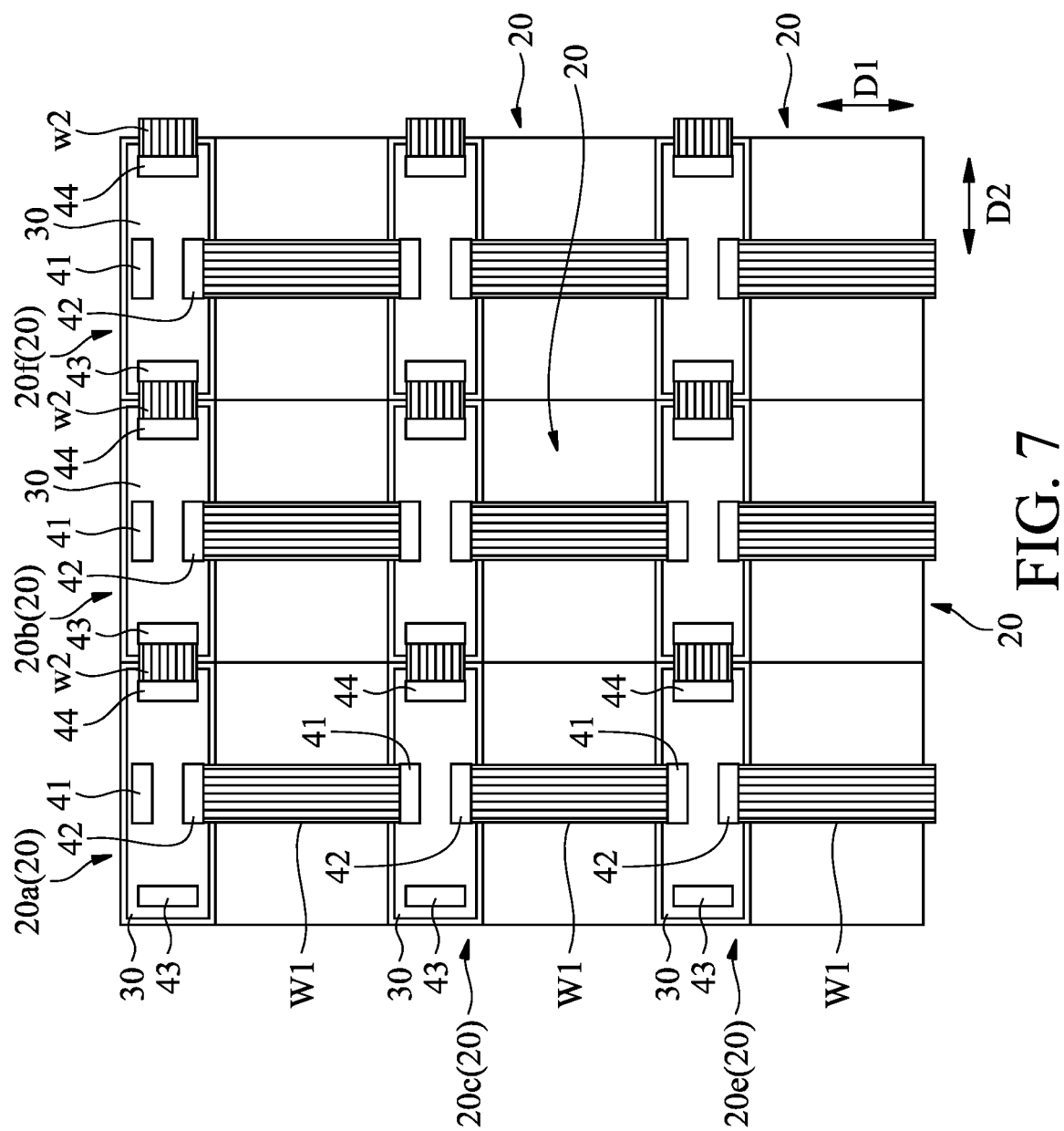
FIG. 7 is a schematic view of the display panel in accordance with some embodiments of the present disclosure.

FIG. 7 is a schematic view of the display panel 20 in accordance with some embodiments of the present disclosure. There are nine display panels 20 shown in FIG. 7. The electronic apparatus 1 further includes circuit boards 30, electrical connectors 41, electrical connectors 42, electrical connectors 43, and electrical connectors 44. The circuit boards 30 are disposed on the rear surfaces of the display panels 20. The electrical connector 41, the electrical connector 42, the electrical connector 43, and the electrical connector 44 are disposed on the circuit board 30. The electrical connectors 41 and the electrical connectors 42 are located at two opposite sides of the circuit boards 30. The electrical connectors 43 and the electrical connectors 44 are located at two opposite sides of the circuit boards 30.

In the display panels 20 arranged in the first direction D1, electrical connectors 41 and electrical connectors 42 are arranged in the first direction D1. In the display panels 20 arranged in the second direction D2, electrical connectors 43 and electrical connectors 44 are arranged in the second direction D2.

As shown in FIG. 7, electrical connector (first electrical connector) 42 of the display panel 20a may be connected to electrical connector (second electrical connector) 41 of the display panel 20c via a connection cable W1. Electrical connector 42 of the display panel 20c may be connected to electrical connector 41 of the display panel 20e via a connection cable W1. The electrical connector 42 of the display panel 20e may be connected to a signal source (not shown).

The image signal generated by the signal source can be transmitted to display panel 20e, display panel 20c, and display panel 20a via the connection cable W1. Accordingly, use of the connection module W1, electrical connector 41 and electrical connector 42 may reduce the complexity of connecting the display panel 20 to the signal source.

As shown in FIG. 7, electrical connector 44 of the display panel 20a may be connected to electrical connector 43 of the display panel 20b via a connection cable W2. Electrical connector 44 of the display panel 20b may be connected to electrical connector 43 of the display panel 20f via a connection cable W2. The display panel 20f the electrical connector 44 may be connected to a power supply (not shown). The power generated by the power source can be transmitted to display panel 20f, display panel and display panel 20a via the connection cable W2. Accordingly, in the embodiment, the process of connecting the display panel 20 to the power supply may be simplified by using the connection cable W2, electrical connector 43, and electrical connector 44.

The disclosed features may be combined, modified, or replaced in any suitable manner in one or more disclosed embodiments, but are not limited to any particular embodiments.

In conclusion, the electronic apparatus of the present disclosure may improve the quality of an integrated image by connecting display panels with only small differences in brightness and chromaticity. Moreover, the pitch of each two adjacent light-emitting elements may be made equal by cutting the edge of the display panels. In the present disclosure, the reflection of light on the display panel may be reduced by disposing the low-reflection material on the edge of the display panel and reducing the shading material around the light-emitting elements. The gap between display panels may be made less noticeable by disposing materials having approximately the same reflectivity as the display panels on the edge of the display panel. Moreover, in the present disclosure, a connection cable may be used to connect multiple display panels in series to reduce the complexity of the assembly of the electronic apparatus.

While the present disclosure has been described by way of example and in terms of embodiments, it should be understood that the present disclosure is not limited thereto. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronic apparatus, comprising:
a first light emitting array comprising a plurality of first light-emitting units disposed in a first region and a first sub region, wherein the first sub region is included in the first region, and an area of the first sub region is less than an area of the first region; and
a second light emitting array disposed adjacent to the first light emitting array, the second light emitting array comprising a plurality of second light-emitting units disposed in a second region and a second sub region, wherein the first sub region is adjacent to the second sub region, the second sub region is included in the second region, and an area of the second sub region is less than an area of the second region;
wherein a difference between an average brightness in the first region and an average brightness in the second region is in a range from 0% to 20%, and a difference between an average brightness in the first sub region and an average brightness in the second sub region is less than the difference between an average brightness in the first region and an average brightness in the second region.

2. The electronic apparatus as claimed in claim 1, wherein the difference between the average brightness in the first sub region and the average brightness in the second sub region is in a range from 0% to 14%.

3. The electronic apparatus as claimed in claim 1, wherein the area of the first region is substantially equal to the area of the second region.

4. The electronic apparatus as claimed in claim 1, wherein the area of the first sub region is substantially equal to the area of the second sub region.

5. The electronic apparatus as claimed in claim 1, wherein a difference between an X-axis chromaticity coordinate in the first region and an X-axis chromaticity coordinate in the second region is in a range from 0 to 0.01.

6. The electronic apparatus as claimed in claim 1, wherein a difference between a Y-axis chromaticity coordinate in the first region and a Y-axis chromaticity coordinate of in the second region is in a range from 0 to 0.01.

7. The electronic apparatus as claimed in claim 1, wherein a difference between an X-axis chromaticity coordinate in the first sub region and an X-axis chromaticity coordinate in the second sub region is in a range from 0 to 0.008.

8. The electronic apparatus as claimed in claim 1, wherein a difference between a Y-axis chromaticity coordinate in the first sub region and a Y-axis chromaticity coordinate in the second sub region is in a range from 0 to 0.008.

9. The electronic apparatus as claimed in claim 1,
wherein the plurality of first light-emitting units are disposed in a first inner region, the first inner region is included in the first sub region, and an area of the first inner region is less than the area of the first sub region,
wherein the plurality of second light-emitting units are disposed in a second inner region, the second inner region is included in the second sub region, and an area of the second inner region is less than the area of the second sub region,
wherein a difference between an average brightness in the first inner region and an average brightness in the second inner region is in a range from 0% to 10%.

10. The electronic apparatus as claimed in claim 9, wherein a difference between an X-axis chromaticity coordinate in the first inner region and an X-axis chromaticity coordinate in the second inner region is in a range from 0 to 0.006.

11. The electronic apparatus as claimed in claim 9, wherein a difference between a Y-axis chromaticity coordinate in the first inner region and a Y-axis chromaticity coordinate in the second inner region is in a range from 0 to 0.006.

* * * * *